(12) United States Patent
Wilson

(10) Patent No.: US 6,259,064 B1
(45) Date of Patent: Jul. 10, 2001

(54) CONCENTRIC AIR DELIVERY AND RETURN OVEN

(76) Inventor: W. Robert Wilson, 6043 Del Norte, Dallas, TX (US) 75225

(*) Notice: Subject to any disclaimer, the term of this patent is extended or adjusted under 35 U.S.C. 154(b) by 0 days.

(21) Appl. No.: 09/534,819

(22) Filed: Mar. 25, 2000

Related U.S. Application Data

(63) Continuation-in-part of application No. 09/276,927, filed on Mar. 26, 1999, now Pat. No. 6,049,066.

(51) Int. Cl.[7] ........................................................... A21B 1/00
(52) U.S. Cl. ........................... 219/400; 219/388; 126/214; 34/223; 34/232
(58) Field of Search ..................................... 219/400, 388, 219/681, 679; 126/21 A; 34/212, 213, 214, 216, 223, 232, 233; 99/443 C, 386, 476, 477; 432/59, 145, 152, 144, 176

(56) References Cited

U.S. PATENT DOCUMENTS

| | | | |
|---|---|---|---|
| 4,757,800 | * 7/1988 | Shei et al. | 128/21 A |
| 4,960,100 | 10/1990 | Pellicane | 126/21 A |
| 5,131,841 | 7/1992 | Smith et al. | 432/59 |
| 5,205,274 | 4/1993 | Smith et al. | 126/21 A |
| 5,671,660 | 9/1997 | Moshonas | 99/433 C |
| 5,676,044 | * 10/1997 | Lara, Jr. | 99/331 |
| 5,717,192 | 2/1998 | Dobie et al. | 219/681 |
| 5,934,178 | * 8/1999 | Caridis et al. | 99/330 |
| 5,964,044 | 10/1999 | Lauersdorf et al. | 34/224 |
| 6,049,066 | 4/2000 | Wilson | 219/400 |

* cited by examiner

Primary Examiner—Teresa Walberg
Assistant Examiner—Shawntina Fuqua
(74) Attorney, Agent, or Firm—Crutsinger & Booth

(57) ABSTRACT

An impingement heat transfer device for transferring heat between a stream of temperature controlled air and a product wherein an air supply duct and an air return duct have a common wall. A tube has one end communicating with the inside of the air supply duct and another end extending through an opening in the air return duct. Air is circulated to reduce pressure in the air return duct and increase pressure in the air supply duct such that a stream of air flows through and out of the tube and spent air is drawn through the opening encircling the tube into the air return duct.

22 Claims, 4 Drawing Sheets

CONCENTRIC AIR DELIVERY AND RETURN OVEN

CROSS-REFERENCE TO RELATED APPLICATION

This application is a continuation-in-part of application Ser. No. 09/276,927 filed Mar. 26, 1999, now U.S. Pat. No. 6,049,066 entitled "CONCENTRIC AIR DELIVERY AND RETURN OVEN."

TECHNICAL FIELD

The invention disclosed herein relates to impingement heat transfer apparatus for preparing food.

BACKGROUND OF INVENTION

Pizzas and other fast food products are generally cooked in ovens to bake the crust and to bake, heat, and melt the toppings. One style of pizza oven is a deck oven that uses radiant and conductive heat for cooking. Typically, the required baking time in a deck oven would be in a range between about 15 and 25 minutes.

An impingement oven uses mostly convection to heat the pizza, as well as some heat of conduction. The newer pizza ovens typically are impingement ovens which move the pizzas through the oven on conveyors while others are equipped with rotating turntables for moving the pizza relative to air streams that impinge the pizza.

An impingement oven is described in U.S. Pat. No. 4,679,542 to Don Paul Smith. These ovens, which are a special type of forced convection oven using columnated heated air to impact the pizza, have increased heat transfer capabilities and therefore have reduced the bake time of pizza and other foods significantly.

Impingement ovens have achieved wide acceptance among pizza restaurants, and pizza delivery systems, especially those which deal with high volume and fast service. The typical bake time for the commercially available impingement ovens is in the range of about 5 to 9 minutes. However, by using partially pre-baked crust in an impingement oven at a relatively high temperature, the final cooking time may be reduced to a little over one minute.

U.S. Pat. No. 4,965,435 discloses a jet impingement oven in which spent air from jets formed by tubes is drawn toward the front wall of the oven. U.S. Pat. No. 5,310,978 discloses an oven in which spent is drawn toward opposite sides of the oven for returning the spent air to a fan. U.S. Pat. No. 5,510,601 discloses an air impingement oven wherein air is delivered by a fan into hollow fingers for forming columns of heated air that are projected through tubes. After the columns of air impinge against the surface of the food product, the spent air is drawn toward the back wall of the oven.

Pellicane U.S. Pat. No. 4,960,100 discloses a plurality of spaced discrete nozzles, each nozzle defining a slot orifice disposed transverse to the path of travel of a conveyor. The nozzles are spaced along the path of travel so that the surface of the product to be cooked which is impinged upon by air flowing through the nozzles will pass from an area of high velocity to an area of low velocity between the slot orifices.

Moshonas U.S. Pat. No. 5,671,660 discloses a blower which draws air from a baking chamber through apertures into a suction chamber extending between air distributors which dispense air back into the baking chamber.

In each of the patents referred to above, after the jets impinge upon the surface of the product, the spent air is drawn around or through jets of air that have not yet impinged against the surface of the product. This tends to disrupt or "wash out" the collimated jets of air.

SUMMARY OF INVENTION

The impingement heat transfer device disclosed herein transfers heat between a stream of temperature controlled air and a product wherein an air supply duct and an air return duct have a common wall. A pattern of tubes, where each tube has one end communicating with the inside of the air supply duct and another end extending through an opening in the air return duct. Air is circulated by a fan to reduce pressure in the air return duct and increase pressure in the air supply duct such that a stream of air flows through and out of the tubes and spent air is drawn through the opening encircling each tube into the air return duct.

A preferred method of transferring heat between a stream of temperature controlled air and a product in an impingement heat transfer device includes the step of directing a plurality of streams of air to impinge against a plurality of splash areas spaced over the surface of the product such that heat is transferred between each stream of air and the splash area against which it impinges. Each stream, after impinging on the product, is diffused transversely away from the stream to form a volume of spent air.

Each volume of spent air is drawn transversely toward the stream of air that was diffused to form the spent volume such that spent air from each of the plurality of streams does not influence the flow of air toward the product in any other stream.

Each volume of spent air is collected adjacent the stream of air that was diffused to form the spent volume.

Imparting relative movement between the product and the plurality of streams, wherein the splash areas move across the surface of the product, causes heat to be transferred substantially uniformly over the surface of the product.

Steps of directing a plurality of streams of air to impinge against a plurality of splash areas spaced over the surface of the product and for drawing each volume of spent air transversely toward the stream of air that was diffused to form the spent volume are preferably accomplished by providing an air supply duct and an air return duct having a common wall wherein a tube has one end communicating with the inside of the air supply duct and another end extending through an opening in the air return duct The opening in the air return duct has an inside diameter and the tube has an outside diameter, the outside diameter of the tube being less than the inside diameter of the opening in the air return duct to form an inlet into the air return duct encircling the tube. A stream of air flows through and out of the tube and spent air is drawn through the opening encircling the tube into the air return duct.

This process produces a plurality of areas of low pressure, at least one of the areas of low pressure being adjacent to and encircling each of the plurality of tubes and spaced from the outlet of each tube wherein spent air is drawn toward the area of low pressure encircling the tube after the stream impinges the product and before the spent air flows to influence the flow of air toward the product in any other stream. Air from each tube has an independent air return path and adjacent air streams do not influence air flow from another tube. Air flow from each tube is balanced and does not disturb the integrity of other air streams.

An impingement heat transfer device for accomplishing the transfer of heat between a stream of temperature controlled air and a food product generally includes a cabinet and fan or blower for directing a plurality of streams of air to impinge against a plurality of splash areas spaced over the surface of the product such that heat is transferred between each stream of air and the splash area against which it impinges. Each stream is diffused transversely away from the stream to form a volume of spent air.

Spent air collectors are provided in the cabinet for drawing each volume of spent air transversely relative to the direction of flow of the stream toward the stream of air that was diffused to form the spent volume. Thus, spent air from each of the plurality of streams does not influence the flow of air toward the product in any other stream and each volume of spent air is collected adjacent the stream of air that was diffused to form the spent volume. Spent air from each stream of air is concentrically balanced with the volume of air in the original air stream.

The product may be carried on a conveyor or turntable for imparting relative movement between the product and the plurality of streams or in the alternative the apparatus forming the streams may move to impart movement of the splash areas across the surface of the product such that heat is transferred substantially uniformly over the surface of the product.

Fingers in the cabinet form and direct a plurality of streams of air to impinge against a plurality of splash areas spaced over the surface of the product such that heat is transferred between each stream of air and the splash area against which it impinges.

The fingers serve the dual function of forming collectors between adjacent streams for collecting spent air such that spent air from each of the plurality of streams does not influence the flow of air toward the product in any other stream and for collecting each volume of spent air adjacent the stream of air that was diffused to form the spent volume.

Each finger preferably includes an air return duct having a wall having a plurality of inlet openings with inside diameters; a tube having an outside diameter and having a tubular passage extending through each of said inlet openings in the air return duct, wherein the OD of the tube is less than the ID of the inlet opening and the outlet is spaced from the wall of the air return duct. Pressure in the air return duct is maintained less than pressure outside the air return duct for producing areas of low pressure encircling each of the plurality of tubular passages and spaced from the outlets wherein spent air is drawn toward the inlet openings which encircle the tubular passage.

DESCRIPTION OF THE DRAWINGS

Drawings of a preferred embodiment of the invention are annexed hereto so that the invention may be better and more fully understood, in which.

Numeral references are employed to designate like parts throughout the various figures of the drawings.

DESCRIPTION OF A PREFERRED EMBODIMENT

Figure 1:
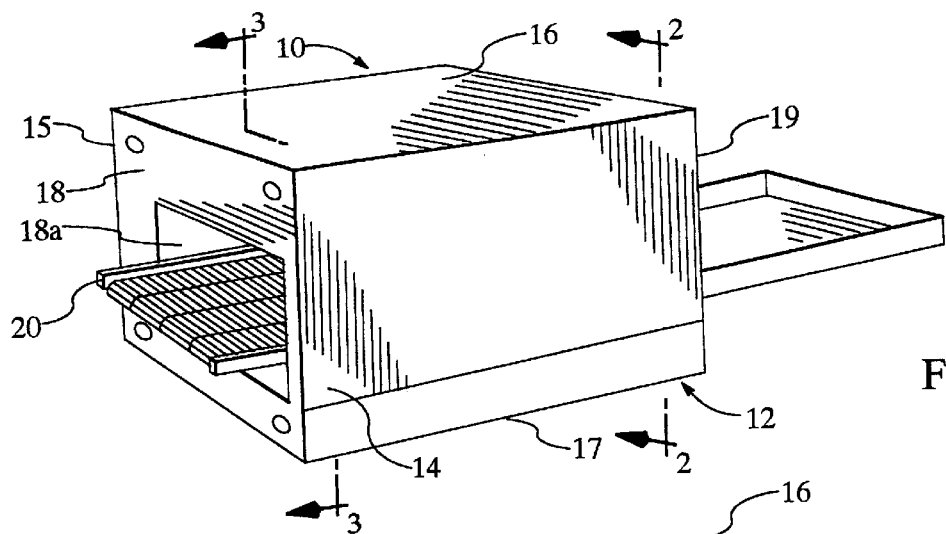
FIG. 1 is a perspective view of a conveyorized oven.
Figure 2:
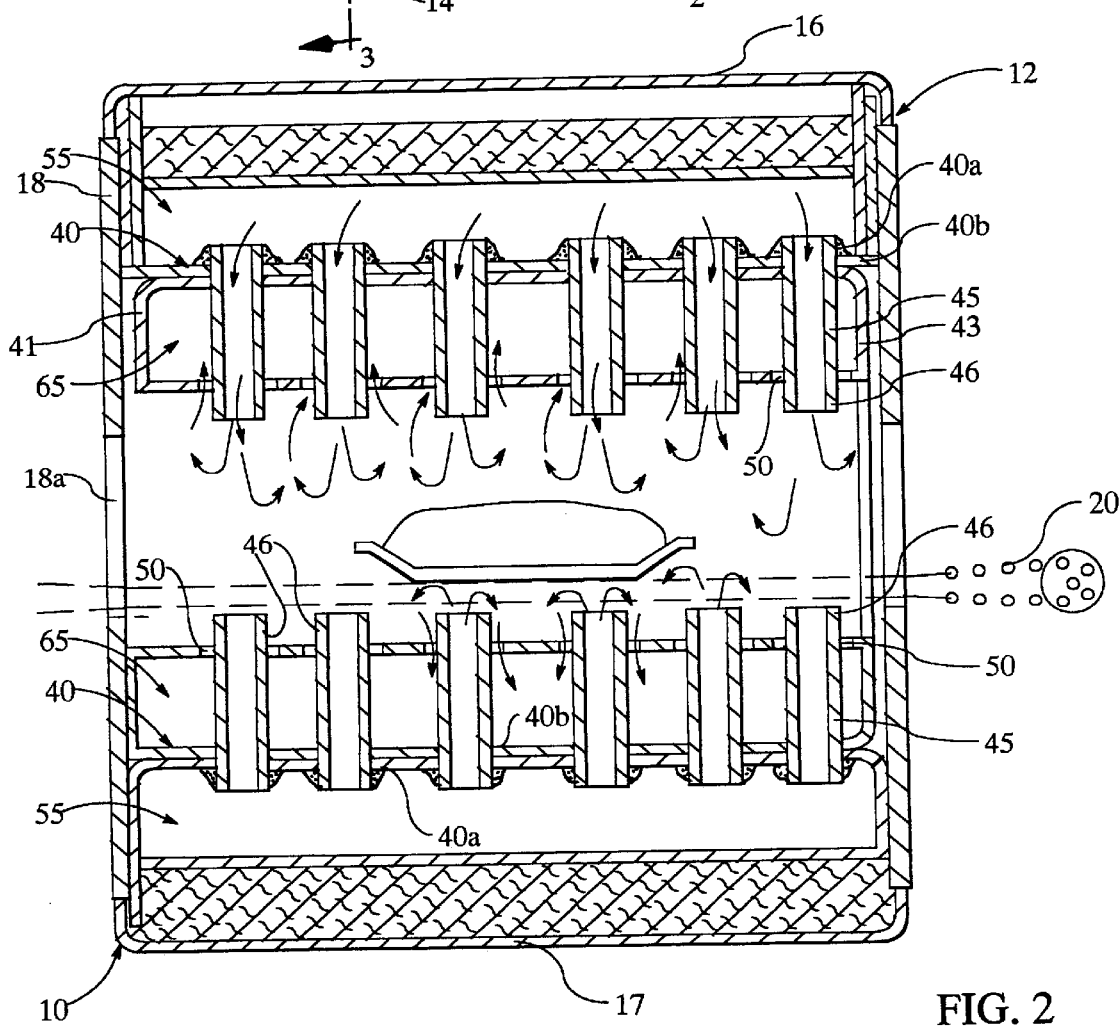
FIG. 2 is a cross-sectional view taken substantially along line 2—2 of FIG. 1.

Referring to FIG. 1 of the drawing, the numeral 10 generally designates a conveyorized impingement oven which includes a cabinet 12 and a conveyor 20. Cabinet 12 has a front wall 14, rear wall 15, top wall 16, bottom wall 17 and end walls 18 and 19. As illustrated in FIGS. 1 and 2, end wall 18 has an entrance opening 18a and end wall 19 has an exit opening 19a through which conveyor 20 extends for moving food products through an interior compartment 30 inside cabinet 12.

Conveyor 20 is preferably formed by spaced bars connected by chains driven by a motor for continuous, intermittent or reciprocating movement of a pan P through compartment 30.

For a description of details for a cabinet of the general type designated by numeral 12 in FIG. 1 of the drawing, references maybe made to Kaminski et al U.S. Pat. No. 4,753,215; Henke U.S. Pat. No. 4,881,519 and Smith et al U.S. Pat. No. 5,131,841. Each of these patents disclose conveyorized impingement ovens.

Referring to FIGS. 1 and 2 of the drawing, upper finger 32 and lower finger 34 are positioned in cabinet 12 above and below conveyor 20. Fingers 32 and 34 are of substantially identical construction and each is configured for concentric balancing of air delivered by forming streams which impinge upon the surface of the food product carried on conveyor 20 and a volume of spent air which results from impingement of each air stream against the food product.

Each finger 32 and 34 has an outer wall 42 and an inner wall 44 spaced on opposite sides of a partition wall 40. In the embodiment illustrated in FIGS. 3 and 4, partition wall 40 is formed of two plates 40a and 40b to facilitate cleaning.

Partition wall 40 has an array of openings formed therein through which hollow tubes 45 extend with ends of tubes 45 being secured to partition wall 40. Inner wall 44 of each finger 32 and 34 has an array of openings 50 through which ends 46 of tubes 45 extend.

Figure 3:
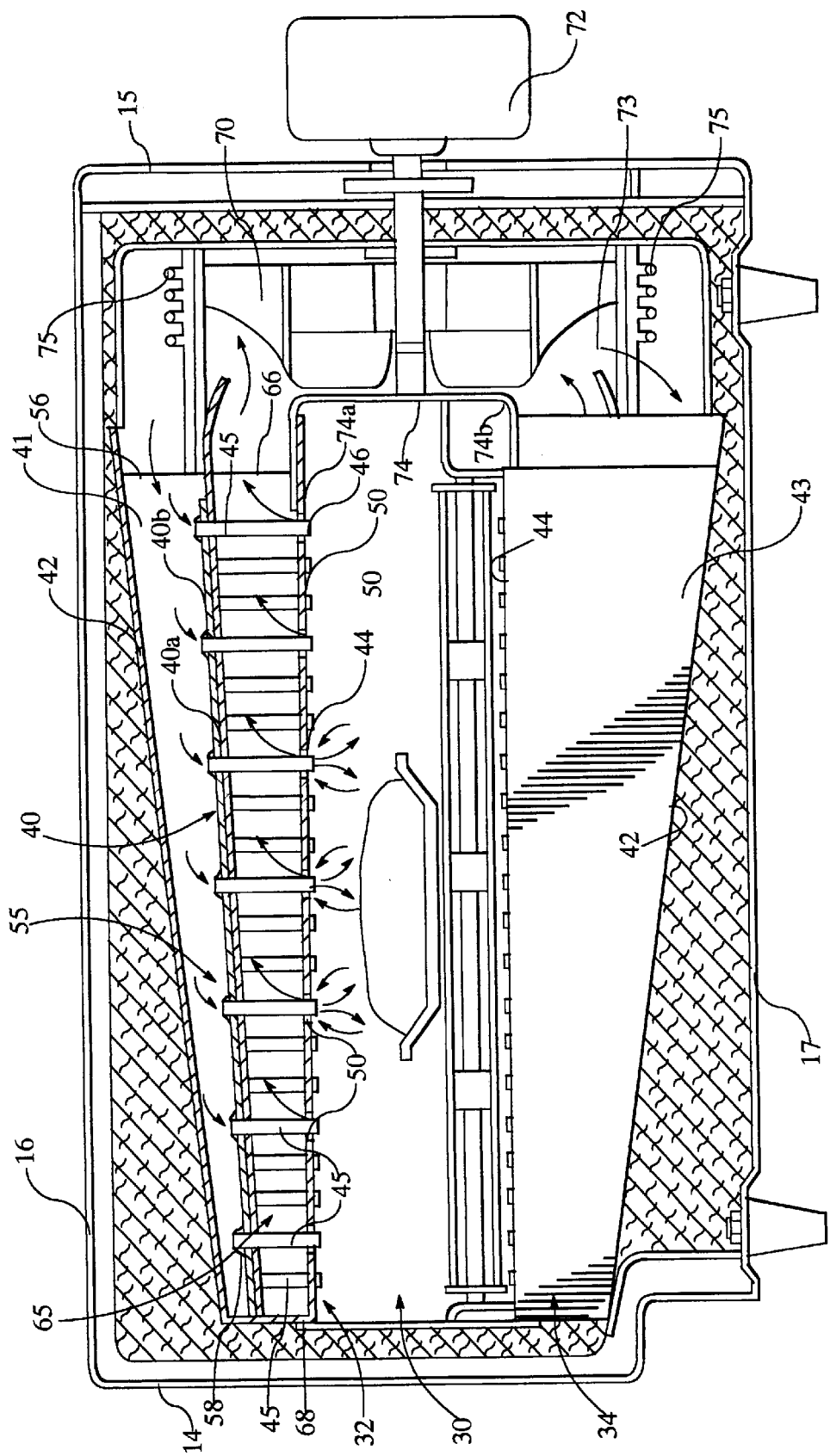
FIG. 3 is a cross-sectional view taken substantially along line 3—3 of FIG. 1.

As best illustrated in FIG. 2 of the drawing, upper finger 32 and lower finger 34 each has end walls 41 and 43 welded or otherwise secured to edges of partition wall 40, outer wall 42 and inner wall 44 for forming a tapered air delivery duct 55 on one side of partition wall 40 and an air return duct 65 on the opposite side of partition wall 40. As best illustrated in FIG. 3 of the drawing, air delivery duct 55 preferably has a tapered cross-section extending from an entrance end 56 toward an outer end 58. Return duct 65 preferably has a tapered cross-section which increases in area from outer end 68 toward the outlet end 66.

A fan blade 70, driven by an electric motor 72 is configured for drawing air from return duct 65 and for delivering air over an electric heating element 75 into air delivery duct 55.

Fan 70 is mounted in a plenum 73 bounded by rear wall 15, top wall 16, bottom wall 17, end walls 18 and 19 and plenum wall 74. Plenum wall 74 is preferably formed with upper and lower flanges 74a and 74b for supporting inner walls 44 of upper finger 32 and lower finger 34.

Figure 5:
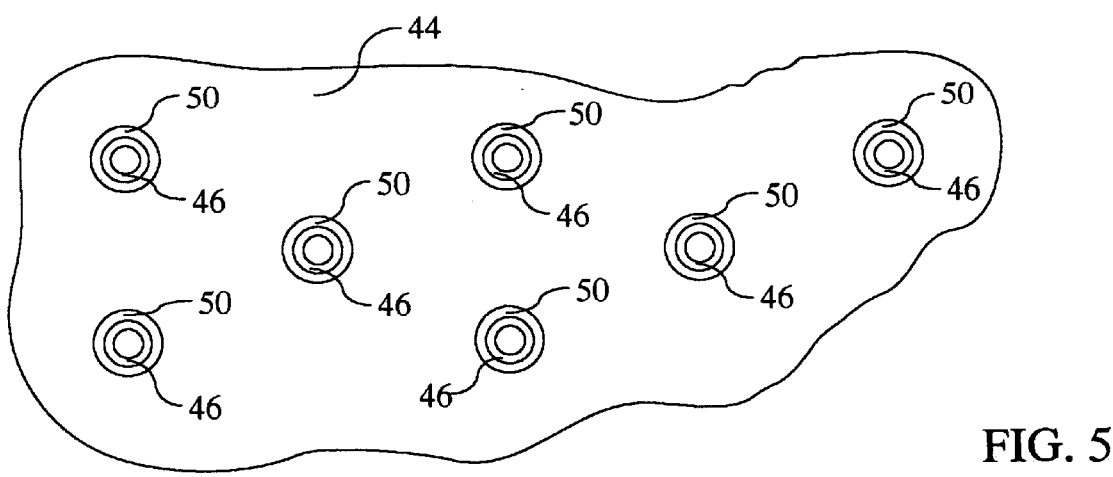
FIG. 5 is a diagrammatic view of an array of overlapping rows and columns of tubes and air return passages.

Tubes 45 are preferably arranged in overlapping rows and columns, as best illustrated in FIG. 5, which impinge against an array of splash areas directly below each tube 45 such that heat delivered by air streams formed by tubes 45 provide substantially uniform coverage over a pan surface moving through compartment 30.

Figure 4:
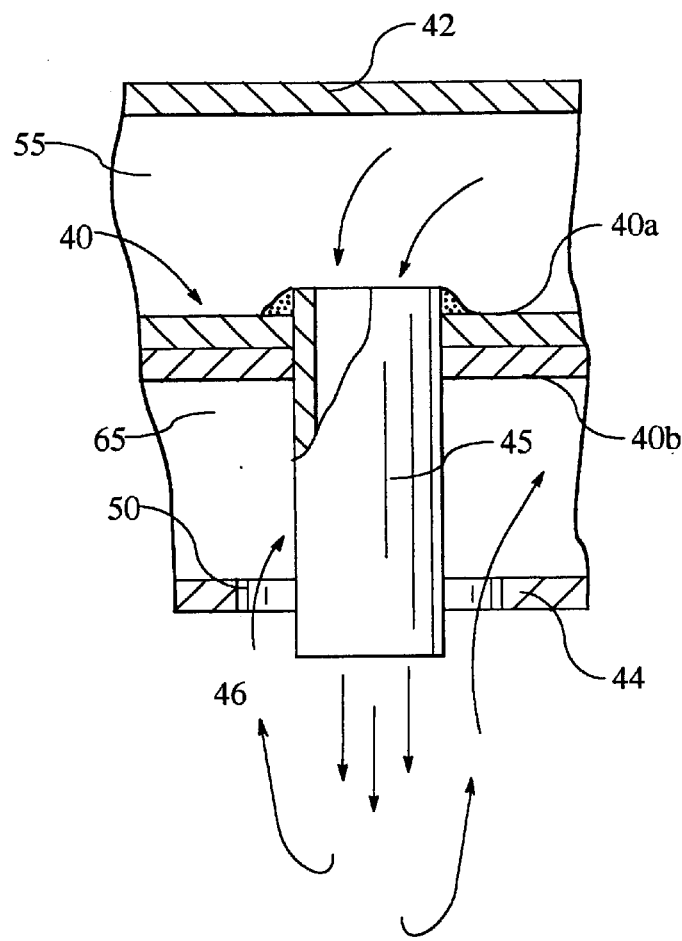
FIG. 4 is an enlarged fragmentary cross-sectional view illustrating the relationship of an air delivery tube and an air return passage encircling the tube.

As illustrated in FIGS. 2 and 4, lower ends 46 of tubes 45 extend below the lower surface of inner wall 44 a distance sufficient to permit return of spent air toward circular openings 50 without interfering with the stream or columnated jet of air formed by each tube 45.

The distance the end 46 of each tube extends from inner wall 44 of upper and lower fingers 32 and 34 will vary depending upon the outside diameter of tube 45 and the inside diameter of air return passages 50 which is dictated primarily by the volume of air to be delivered by fan 70. However, it should be readily apparent that the air from each air stream is collected by a concentric passage 50 encircling tube 45 such that spent air from one stream does not influence air flowing from an adjacent tube 45 before it impinges against the surface of the food product. The stream of air formed by each tube 45 has an independent air return path encircling tube 45.

Tubes 45 are arranged for directing a plurality of streams of air or other temperature controlled fluid from delivery duct 55 to impinge against a plurality of splash areas spaced over the surface of the product carried in pan P such that heat is transferred between each stream of fluid and the splash area against which it impinges. Air in each stream is diffused transversely away from the stream to form a volume of spent air which is drawn toward opening 50 encircling tube 45 that formed the stream. Since each volume of spent fluid is collected adjacent the stream that was diffused, the volume of air from each stream is concentrically balanced with the return air drawn through opening 50.

The concentric balancing of air flow from upper and lower tubes 45 eliminates the tendency of air streams to be washed out by air returning to fan 70. It should also be readily apparent that the tendency of air to flow through the inlet and outlet openings 18a and 19a adjacent opposite ends of cabinet 12 is minimized and that movement of air within the cabinet 12, along the interior surfaces of the outside walls, will be minimized with a favorable effect on energy efficiency.

The term "heat transfer" as used herein is intended to include heating or cooling. It should be readily apparent that heating element 75 may be replaced by a cooling coil without departing from the basic concept of the invention.

SECOND EMBODIMENT

Figure 6:
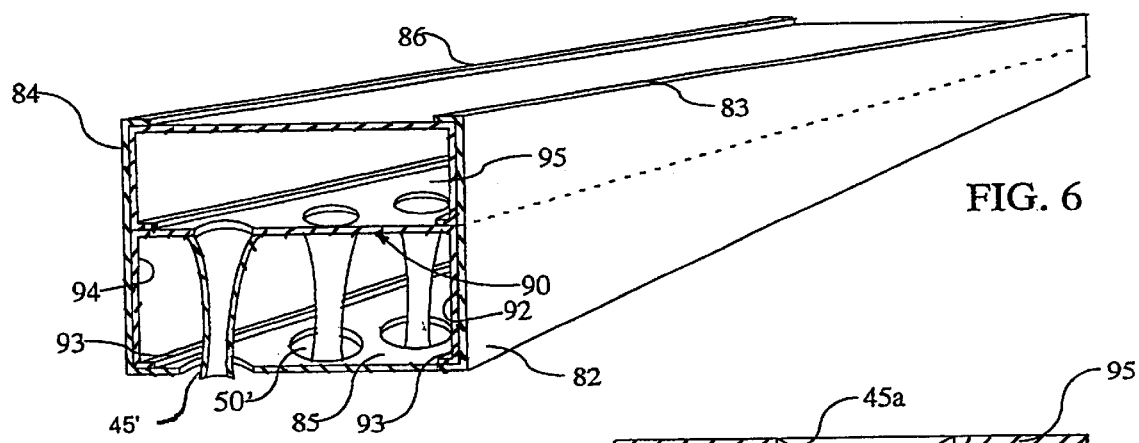
FIG. 6 is a diagrammatic view of a second embodiment of a finger having an air delivery duct and an air return duct formed therein.
Figure 7:
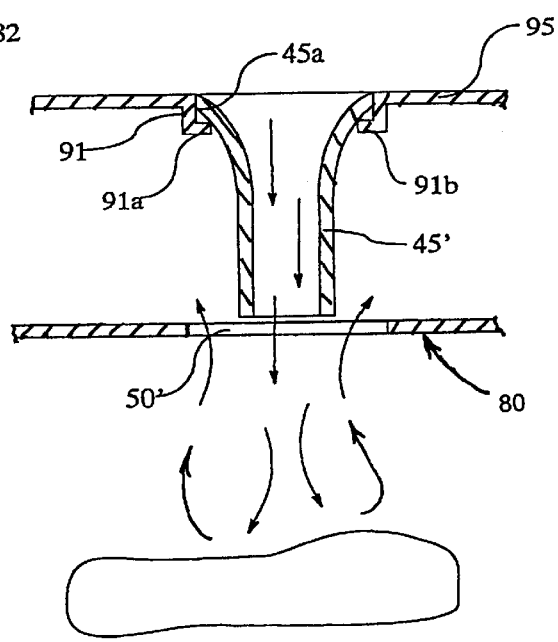
FIG. 7 is an enlarged cross-sectional view illustrating an air delivery tube according to the second embodiment.
Figure 8:
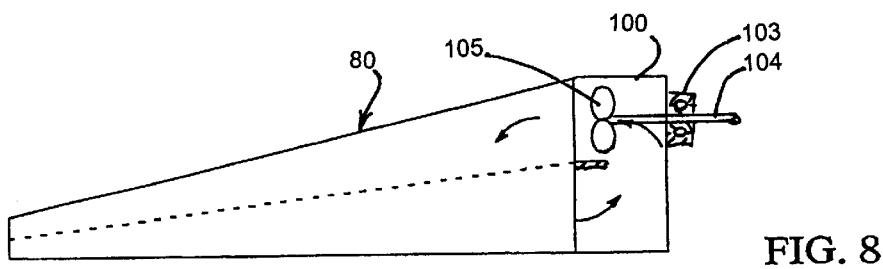
FIG. 8 is a schematic view of the finger illustrated in FIG. 6.

A second embodiment of the invention is illustrated in FIGS. 6, 7 and 8 of the drawing, in which the numeral 80 generally designates a finger similar to upper finger 32 and lower finger 34 hereinbefore described in the description of a preferred embodiment. Finger 80 is longitudinally tapered and includes a generally U-shaped housing having a web portion 85 and spaced legs 82 and 84 extending along opposite edges of web portion 85. Legs 84 and 85 have flanges 83 and 86. Air return openings 50' are formed in web portion 85 of finger 80.

An inverted generally U-shaped channel member 90 includes a web portion 95 and downwardly extending legs 92 and 94, having flanges 93 on lower ends thereof As best illustrated in FIG. 7, web portion 95 has an array of cups 91 having inwardly extending shoulders 91a with a central passage 91b formed therein. Shaped tubes 45' are configured to extend through passages 91b and shoulders 91a engage shoulders 45a formed on upper ends thereof. It should be readily apparent that tubes 45' can be inserted from above web portion 95 through passages 95b and moved downwardly to the position illustrated in FIG. 7 wherein the shoulder 45a engages shoulder 91a to form a substantially flat upper surface on web portion 95. If it is deemed expedient to do so, shoulders 45a and 91a may be brazed or otherwise rigidly secured together.

The cross-sectional area of the stream of air flowing out of tube 45' reduces to a minimum at a vena contracta spaced from the lower end of tube 45'. The lower end of tube 45' and apertures 50' are positioned such that the vena contracta V is positioned to minimize interference with return air drawn through the annular passage 50' around the lower end of tube 45'. The lower end of tube 45' may be positioned above or below the plane of web portion 85 depending upon the velocity, density and temperature of air being delivered through tube 45'.

While fingers 80 and upper and lower fingers 42 and 43 may be interchangeable, it is contemplated that fingers 80 will be mounted on a mounting plate connectable to an oven wall with or without a heating or cooling element of the type designated by the numeral 75 in FIG. 3 of the drawing. It is contemplated that fingers 80 may be installed at desired locations in an oven above and/or below a conveyor for circulating heated air in the oven, for example in an oven configured for cooking bakery products. Air in the oven is heated to a predetermined temperature, for example about 450°. Mounting a fan for drawing air through passages 50' and delivering air through tubes 45' induces circulation of air in the cooking chamber to impinge against the surface of a product to facilitate drying, crisping or browning the outer surface of the product without providing a heating element separate and apart from a conventional heater which heats air in the cooking compartment of the oven.

As illustrated in FIG. 8 of the drawing, a plenum 100 is bolted or otherwise secured to a wall of the oven. A fan 105 mounted therein is driven by a drive shaft 104 supported in bearings 103. Fan 105 draws air through apertures 50' into the return passage and dispenses the air from the supply duct through tubes 45'.

Shoulders and hangers are provided adjacent opposite ends of finger 80 for removably securing finger 80 in the cabinet. Finger 80 is advantageously removable for cleaning and maintenance and is preferably formed of stainless steel.

Terms such as "left," "right," "clockwise," "counterclockwise," "horizontal," "vertical," "up," and "down" when used in reference to the drawings, generally refer to orientation of the parts in the illustrated embodiment and not necessarily during use. These terms used herein are meant only to refer to relative positions and/or orientations, for convenience, and are not to be understood to be in any manner otherwise limiting.

While the present invention has been illustrated and described in reference to a preferred embodiment, , it is to be understood that various other embodiments, adaptations and modifications may be made within the spirit and scope of the invention.

What is claimed is:

1. A method of transferring heat between a stream of temperature controlled fluid and a splash area on a product against which the stream impinges on the surface of the product in an impingement heat transfer device comprising the steps of:

providing an air supply duct and an air return duct having a partition wall wherein a tube has one end communicating with the inside of the air supply duct and another end extending through an opening in the air return duct, said opening in the air return duct having an inside diameter and said tube having an outside diameter, said outside diameter of the tube being less than said inside diameter of the opening in the air return duct to form an inlet into the air return duct encircling the tube;

circulating air to reduce pressure in the air return duct and increase pressure in the air supply duct such that a stream of air flows through and out of the tube and spent air is drawn through the opening encircling the tube into the air return duct;

collecting each volume of spent fluid adjacent the stream of fluid that was diffused to form the spent volume; and imparting relative movement between the product and the stream wherein the splash area moves across the surface of the product such that heat is transferred substantially uniformly over the surface of the product.

2. A method of transferring heat between a stream of temperature controlled fluid and a product in an impingement heat transfer device according to claim 1 wherein the steps of:

directing a plurality of streams of fluid to impinge against a plurality of splash areas spaced over the surface of the product such that heat is transferred between each stream of fluid and the splash area against which it impinges and such that each stream is diffused transversely away from the stream to form a volume of spent fluid; and drawing each volume of spent fluid transversely toward the stream of fluid that was diffused to form the spent volume such that spent fluid from each of the plurality of streams does not influence the flow of fluid toward the product in any other stream.

3. A method of transferring heat between a stream of temperature controlled fluid and a product in an impingement heat transfer device, according to claim 1, the step of directing a plurality of streams of fluid to impinge against a plurality of splash areas spaced over the surface of the product comprising the steps of:

delivering temperature controlled fluid through each of a plurality of tubular passages having outlets formed to project a stream of fluid from each outlet.

4. A method of transferring heat between a stream of temperature controlled fluid and a product in an impingement heat transfer device, according to claim 3, the step of drawing each volume of spent fluid transversely toward the stream of fluid that was diffused to form the spent volume comprising the step of:

producing a plurality of areas of low pressure, at least one of said areas of low pressure being adjacent to and encircling each of the plurality of tubular passages and spaced from the outlets wherein spent fluid is drawn toward said areas of low pressure encircling the tubular passage after the stream impinges the product and before the spent fluid flows to influence the flow of fluid toward the product in any other stream.

5. A method of transferring heat between a stream of temperature controlled fluid and a product in an impingement heat transfer device, according to claim 4, the step of collecting each volume of spent fluid adjacent the stream of fluid that was diffused to form the spent volume further comprising the steps of:

forming a plurality of inlet openings having inside diameters (ID) in the wall of an air return duct;

positioning a tube having an outside diameter (OD) and having a tubular passage through each of said inlet openings in said air return duct, said OD of the tube being less than the ID of the inlet opening and said outlet being spaced from the wall of the air return duct; and maintaining pressure in the air return duct less than pressure outside the air return duct for producing areas of low pressure encircling each of the plurality of tubular passages and spaced from the outlets wherein spent fluid is drawn toward said inlet openings which encircle the tubular passage.

6. A method of transferring heat between a stream of temperature controlled fluid and a product in an impingement heat transfer device, according to claim 5, wherein the area of each spent air return inlet opening encircling the tube which is about $\frac{1}{4}(\pi)(ID)^2 - \frac{1}{4}(\pi)(OD)^2$ is greater than the area of the outlet which is about $\frac{1}{4}(\pi)(ID)^2$, where ID is the inside diameter of the inlet and OD is the outside diameter of the tube.

7. A method of transferring heat between a stream of temperature controlled fluid and a product in an impingement heat transfer device, according to claim 1, the step of imparting movement between the product and the plurality of streams such that the splash areas move across the surface of the product wherein heat is transferred substantially uniformly over the surface of the product comprising the step of: moving the product on a conveyor relative to the streams of fluid.

8. A method of transferring heat between a stream of temperature controlled fluid and a product in an impingement heat transfer device, according to claim 1, the step of imparting movement between the product and the plurality of streams such that the splash areas move across the surface of the product wherein heat is transferred substantially uniformly over the surface of the product comprising the step of: moving either one of the stream or the product relative to the other of the stream or the product.

9. A method of transferring heat between a stream of temperature controlled fluid and a product in an impingement heat transfer device, according to claim 1, with the addition of the step of moving the collected fluid adjacent a heat exchanger for controlling the temperature of the fluid.

10. An impingement heat transfer device for transferring heat between a stream of temperature controlled fluid and a product comprising:

a cabinet:

means in said cabinet for directing a plurality of streams of fluid to impinge against a plurality of splash areas spaced over the surface of the product such that heat is transferred between each stream of fluid and the splash area against which it impinges and such that each stream is diffused transversely away from the stream to form a volume of spent fluid;

an air return duct having a wall having a plurality of inlet openings with inside diameters (ID);

a tube having an outside diameter (OD) and having a tubular passage extending through each of said inlet openings in said air return duct, said OD of the tube being less than the ID of the inlet opening and said outlet being spaced from the wall of the air return duct;

means for maintaining pressure in the air return duct less than pressure outside the air return duct for producing areas of low pressure encircling each of the plurality of tubular passages and spaced from the outlets wherein spent fluid is drawn toward said inlet openings which encircle the tubular passage; and means for imparting relative movement between the product and the plurality of streams wherein the splash areas move across the surface of the product such that heat is transferred substantially uniformly over the surface of the product.

11. An impingement heat transfer device for transferring heat between a stream of temperature controlled fluid and a product, according to claim 10, said means for directing a plurality of streams of fluid to impinge against a plurality of splash areas spaced over the surface of the product comprising: means for delivering temperature controlled fluid through each of a plurality of tubular passages having outlets formed to project a stream of fluid from each outlet.

12. An impingement heat transfer device for transferring heat between a stream of temperature controlled fluid and a product, according to claim 10, said collector means for drawing each volume of spent fluid transversely toward the stream of fluid that was diffused to form the spent volume comprising:

means for producing a plurality of areas of low pressure, at least one of said areas of low pressure being adjacent to and encircling each of the plurality of tubular passages and spaced from the outlets wherein spent fluid is drawn toward said areas of low pressure encircling the tubular passage after the stream impinges the product and before the spent fluid flows to influence the flow of fluid toward the product in any other stream.

13. An impingement heat transfer device for transferring heat between a stream of temperature controlled fluid and a product, according to claim 10, said collector means for drawing each volume of spent fluid transversely toward the stream of fluid that was diffused to form the spent volume such that spent fluid from each of the plurality of streams does not influence the flow of fluid toward the product in any other stream and for collecting each volume of spent fluid adjacent the stream of fluid that was diffused to form the spent volume.

14. An impingement heat transfer device for transferring heat between a stream of temperature controlled fluid and a product, according to claim 10, wherein said means for directing a plurality of streams of fluid to impinge against a plurality of splash areas comprises:

means for imparting relative movement between the streams and the product such that the splash areas move across the surface of the product.

15. An impingement heat transfer device for transferring heat between a stream of temperature controlled fluid and a product, according to claim 10, said means for imparting relative movement between the product and the plurality of streams wherein the splash areas move across the surface of the product such that heat is transferred substantially uniformly over the surface of the product comprising: conveyor means for moving the product relative to the streams of fluid.

16. An impingement heat transfer device for transferring heat between a stream of temperature controlled fluid and a product, according to claim 10, with the addition of means for moving the collected fluid adjacent a heat exchanger for controlling the temperature of the fluid.

17. An impingement heat transfer device for transferring heat between a stream of temperature controlled fluid and a product comprising:

a cabinet:

means in said cabinet for directing a plurality of streams of fluid to impinge against a plurality of splash areas spaced over the surface of the product such that heat is transferred between each stream of fluid and the splash area against which it impinges and such that each stream is diffused transversely away from the stream to form a volume of spent fluid;

collector means encircling each of said streams for collecting spent fluid such that spent fluid from each of the plurality of streams does not influence the flow of fluid toward the product in any other stream and for collecting each volume of spent fluid adjacent the stream of fluid that was diffused to form the spent volume; and means for imparting relative movement between the product and the plurality of streams wherein the splash areas move across the surface of the product such that heat is transferred substantially uniformly over the surface of the product.

18. An impingement heat transfer device for transferring heat between a stream of temperature controlled fluid and a product, according to claim 17, said collector means between adjacent streams in said cabinet for collecting spent fluid comprising:

an air return duct having a wall having a plurality of inlet openings with inside diameters;

a tube having an outside diameter and having a tubular passage extending through each of said inlet openings in said air return duct, said OD of the tube being less than the ID of the inlet opening and said outlet being spaced from the wall of the air return duct; and means for maintaining pressure in the air return duct less than pressure outside the air return duct for producing areas of low pressure encircling each of the plurality of tubular passages and spaced from the outlets wherein spent fluid is drawn toward said inlet openings which encircle the tubular passage.

19. An impingement heat transfer device for transferring heat between a stream of temperature controlled fluid and a product, according to claim 10, said collector means for drawing each volume of spent fluid transversely toward the stream of fluid that was diffused to form the spent volume such that spent fluid from each of the plurality of streams does not influence the flow of fluid toward the product in any other stream and for collecting each volume of spent fluid adjacent the stream of fluid that was diffused to form the spent volume comprising:

a first plate having a body portion, said body portion having an array of openings, each of said openings having a periphery, wherein said body portion surrounding the periphery of each opening in said array of openings is configured to form a jet of air and project said jet of air to impinge against the product;

a second plate having a body portion, said body portion having an array of return passages, said return passages being larger than said openings in said first plate;

means positioning said second plate relative to said first plate such that said jets formed by said body portion surrounding the periphery of each opening are projected through said return passages in a first direction;

means for drawing spent air from each of said jets through said return passage in a second direction; and means for delivering air to said array of openings.

20. An impingement heat transfer device for transferring heat between a stream of temperature controlled fluid and a product, according to claim 19, wherein said body portion of said first plate surrounding the periphery of each opening in said array of openings is cupped to receive an elongated nozzle through which said opening extends, said nozzle having an entrance end adjacent said cupped body portion of said first plate and a second end spaced from said body portion of said first plate.

21. An impingement heat transfer device for transferring heat between a stream of temperature controlled fluid and a product, according to claim 13, wherein said means for maintaining pressure in the air return duct less than pressure outside the air return duct comprises a plenum in said cabinet;

a fan in said cabinet, said fan being configured to draw temperature controlled air from said cabinet through said air return duct and to deliver the temperature controlled air to said means in said cabinet for directing a plurality of streams of fluid to impinge against a plurality of splash areas spaced over the surface of the product.

22. An impingement heat transfer device according to claim 10 with the addition of heater means in said cabinet for maintaining the temperature of air in said cabinet at a predetermined temperature.

\* \* \* \* \*